April 27, 1926.
H. A. CUMFER
1,582,579
APPARATUS FOR PRODUCING CORRUGATED BOARD
Filed March 22, 1923  3 Sheets-Sheet 1
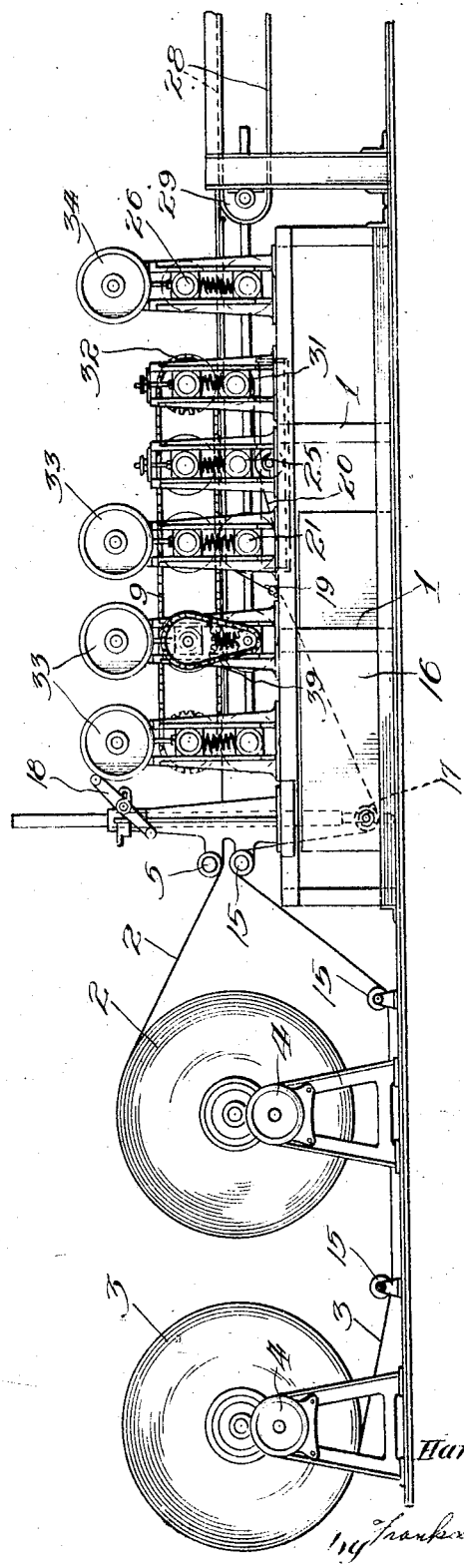
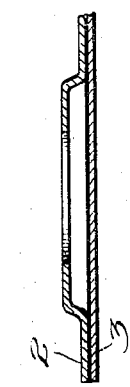
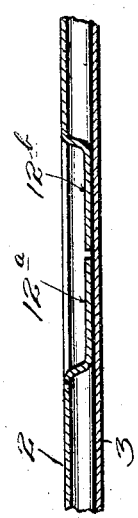
Inventor
Harry A. Cumfer, April 27, 1926.  
H. A. CUMFER  
1,582,579  
APPARATUS FOR PRODUCING CORRUGATED BOARD  
Filed March 22, 1923   3 Sheets-Sheet 2
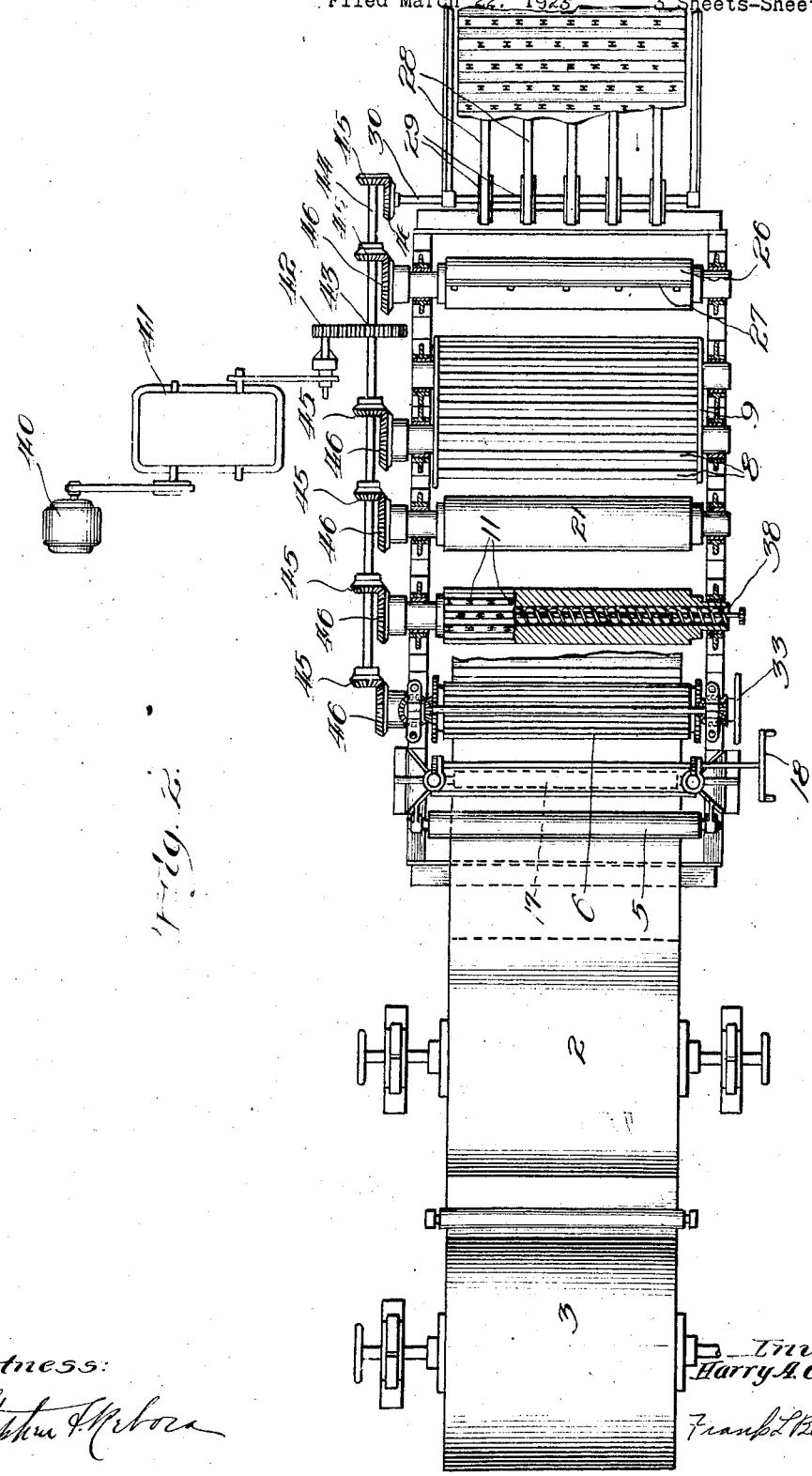

April 27, 1926. 1,582,579
H. A. CUMFER
APPARATUS FOR PRODUCING CORRUGATED BOARD
Filed March 22, 1923   3 Sheets-Sheet 3
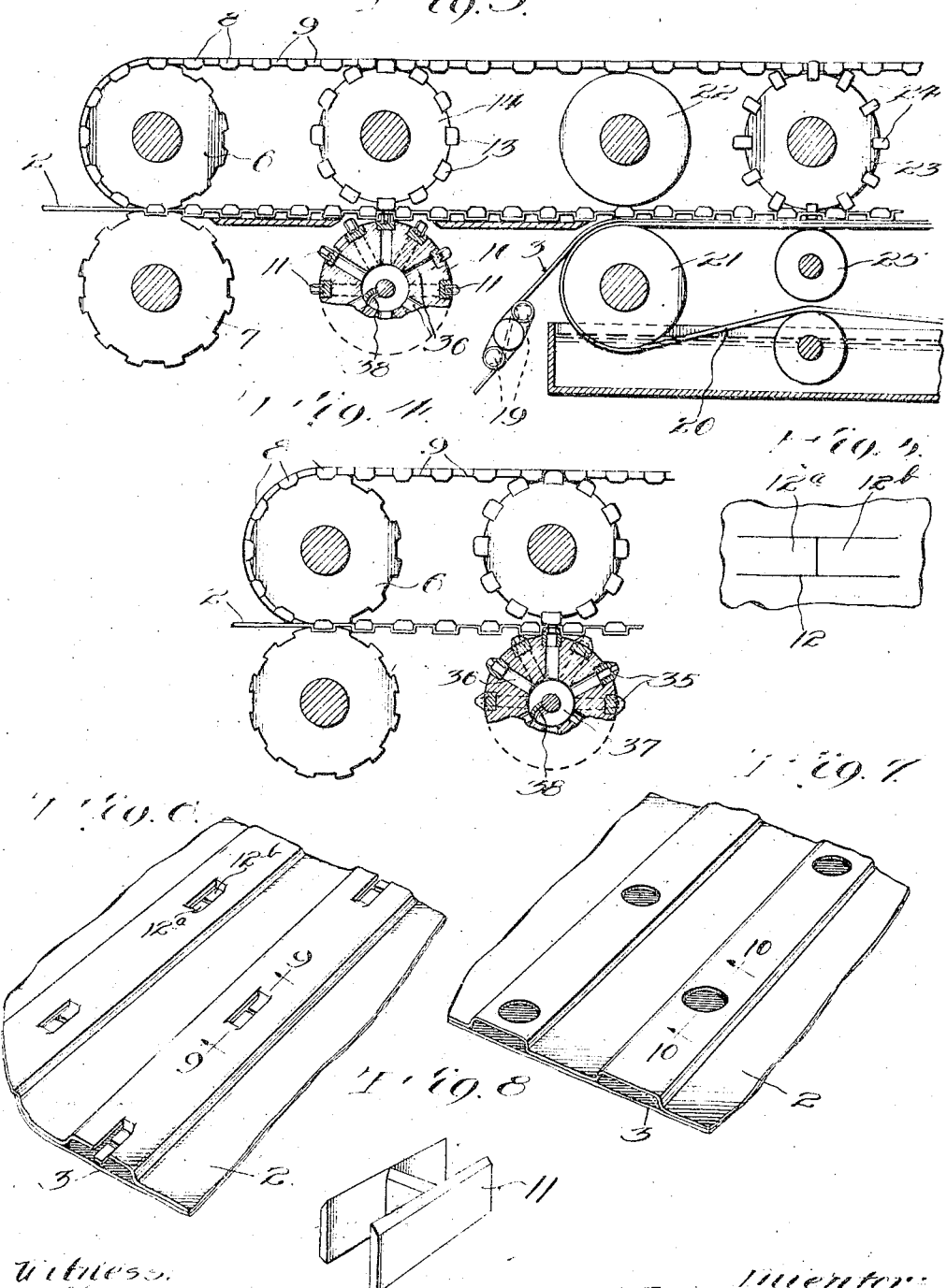

Patented Apr. 27, 1926.

1,582,579

UNITED STATES PATENT OFFICE.

HARRY A. CUMFER, OF CHICAGO, ILLINOIS, ASSIGNOR OF ONE-HALF TO ALBERT D. STEWART, OF HUTCHINSON, KANSAS.

APPARATUS FOR PRODUCING CORRUGATED BOARD.

Application filed March 22, 1923. Serial No. 626,758.

*To all whom it may concern:*

Be it known that I, HARRY A. CUMFER, a citizen of the United States, residing in the city of Chicago, county of Cook, and State of Illinois, have invented certain new and useful Improvements in Apparatus for Producing Corrugated Board, of which the following is a specification.

This invention relates to improvements in an apparatus for producing a corrugated board and refers more particularly to a machine in which separate plies or layers of sheeted material are united together to produce a corrugated construction utilized in different arts or in the making of boxboard, packing boxes, protective insulations in packing, bottle casings, and in the place of metallic or wood lath in constructing walls to be plastered or cemented. The apparatus in its broader aspects has to do with the producing of a corrugated sheet utilized in innumerable ways and varying in its construction according to the use to which it is to be put.

This application is in part a continuation of previous applications Serial No. 504,289 filed September 30th, 1921, since matured into Patent Number 1,525,071 and Serial No. 582,344 filed August 17th, 1922.

Among the objects of the invention are to provide an apparatus in which two sheets of material are fed to the machine, the upper sheet being continuously corrugated and perforated and then united to a base or backing sheet to which has been applied an adhesive substance which may or may not be of waterproofing character; to provide an apparatus in which subsequent to corrugating the sheet is fed through the machine while held in its corrugated form by an endless belt arrangement which prevents the stretching out of the corrugated portions; to provide an apparatus which permits a more rapid production of corrugated sheeted material and one in which a corrugated sheeted substance is produced entailing less expense and at the same time a more perfect product than has heretofore been possible.

Fig. 1 is a side view of the apparatus;

Fig. 2 is a plan view of the apparatus shown in Fig. 1;

Fig. 3 is an enlarged detail view showing the corrugating, cutting and uniting units;

Fig. 4 is an enlarged detail of the modified form of construction;

Fig. 5 is a fragmentary detail of a portion of the sheet showing the method of cutting according to the preferred form;

Fig. 6 is a perspective view of the sheet cut according to the preferred method;

Fig. 7 is a perspective view of a portion of the sheet cut according to the modified method of cutting shown in Fig. 4;

Fig. 8 is an enlarged detail view of the slitting or cutting knives to produce an incision such as that shown in Fig. 5;

Fig. 9 is a view taken along the line 9—9 in Fig. 6; and

Fig. 10 is a view taken along the line 10—10 in Fig. 7.

Referring to the drawings, the apparatus consists essentially of a machine the elements of which are supported by frame members 1. At one end of the machine are positioned reels upon which rolls of paper 2 and 3 are carried. These reels are supported on any type of suitable standard shown at 4. The paper may consist of any suitable stock such as that termed as boxboard or chipboard, or innumerable other types of material of varying grades according to the character of the corrugated sheet which is to be made. The upper sheet 2 fed from the roll 2 is fed over a guide roll 5 and between corrugating elements which consist of an upper corrugating roll 6 and a lower corrugating roll 7. Over the upper corrugating roll runs an endless corrugating element consisting of transverse bars 8 connected by chain links 9. The transverse bars 8 of this corrugating belt register with the depressions between the teeth on the lower corrugating roll 8 and produce right angle corrugations in the sheet 2 which passes between the two rolls. The character of the corrugations will vary according to the shape of the transverse bars which produce the corrugations in the sheet. A rounded or square structure may be formed by varying the surface of the bars contacting with the sheet. The character of the corrugations will be varied also by the configuration of the lower corrugating roll 7 which cooperates with the transverse bars in producing the corrugated structure. After receiving the corrugations the sheet conforms with the surface configuration of the endless corrugating belt and is carried along with the belt in its travel. It remains in this relation continuously in its entire travel through the machine thus preventing any elongation or stretching of the sheet due to the tension imposed thereon during the feeding operation.

The next succeeding unit acting upon the sheet, as shown in Fig. 3, is the cutting or slitting unit which comprises a lower roll 10 upon which are mounted knives 11, such as are shown in Fig. 8. These knives are positioned on the periphery of the roll in a manner to produce incisions in the sheet such as that shown at 12 in Fig. 5, and positioned upon the ridges or corrugations of the upper sheet in an alternate manner such as that shown in Fig. 6. During the cutting of the sheet these knives contact with lugs 13 mounted upon the upper roll 14. After being slit in this manner the corrugated sheet is united to an adhesive coated sheet which is applied to the lower corrugations.

Explaining now the travel of the lower sheet which is applied as a base to the corrugated sheet: Stock reeled from the roll 3 is fed over guide rolls 15 and into a vat of adhesive material shown at 16. A vertical adjustable immersing roll 17 serves to guide the sheet beneath the surface of the coating liquid and is adjustable by means of a handle 18. The adhesive coating may consist of pitchy materials, bitumens, or asphaltic substances, all of which are waterproofing in character, or may comprise glues, or siliceous adhesives which may have the waterproofing characteristics of the former adhesives.

After being immersed in the coating vat, the sheet is directed between doctor blades 19 which scrape the excess coating substance from the surface of the sheet. The sheet is then passed on to a belt 20 running over the pressure roll 21. Prior to the application of the sheet to the surface of the belt there is applied to the belt a substance to prevent the sheet from adhering thereto. This substance may consist of a liquid or a dry powder which will give the belt the necessary non-adhesive characteristic; where a liquid asphaltic binder is used as a coating adhesive, water has been found to be a satisfactory non-adhesive liquid, as it cools and is the asphaltic and prevents it adhering to the belt in its travel. With other adhesive materials it has been found more advisable to use a powdered substance such as graphite, talc, or other materials which have the characteristics of preventing the coating substance from adhering to the supporting belt 20.

Above the pressure roll 21 is a second pressure roll 22 between which the corrugated and the flat base sheet are passed and united. As the adhesive substance sets fixedly binding the two elements, they proceed as a single unit, being carried along by means of the endless corrugating belt.

After being combined, the sheets which have now been made into a single unit are passed beneath a roll 23 upon which are mounted lugs or punches 24 which contact with a lower supporting roll 25. These punching lugs are positioned on the roll 23 so as to press down the free ends 12$^a$ and 12$^b$, shown in Fig. 5, formed by means of the cutting knives 11, as shown in Fig. 8. The function of the punching elements is to depress the free ends against the base or adhesive coated surface of the lower sheet and cause them to adhere thereto to produce the construction as shown in Fig. 6. The depressing of these free ends exposes an open slot on the sides of the depressions into which a relatively plastic substance such as plaster will flow and become set when dried, thus keying the substance more readily to the surface of the corrugated sheet.

From the punching unit the sheet proceeds to a cutting roll 26 upon which is mounted a plate 27 rotated at a predetermined rate, in order to cut the sheet into units of the desired length.

From the cutting unit the sheets are fed over conveyer belts 28 running over pulleys 29 which are mounted upon transverse shaft 30. The opposite ends of these conveying belts have been omitted from the drawings, as their function is merely to convey the units from the machine as they are cut. The supporting belt 20 runs over the rolls 21 and 31 while the endless corrugating belt consisting of the transverse bars 8 connected by chain links 9 is carried by the upper corrugating roll 6 and a sprocket roll 32 positioned above the roll 31.

The corrugating, slitting and uniting units have vertical adjustable means controlled by hand wheels 33 for regulating the pressure between the upper and lower rolls of the respective units. In a like manner a hand wheel 34 controls the functioning of the severing plate by means of which the units are cut into the desired lengths.

In Fig. 4 is shown the apparatus for forming the modified type of construction shown in Fig. 7. That is after corrugating the upper sheet in manner previously explained, there is cut from the corrugations discs by means of circular perforating cutters 35 mounted in place of the slitting knives upon the roll 10. The discs which are cut from the corrugations pass down through the radial ducts 36 to a central compartment 37 from which they are expelled or ejected by means of a spiral conveyor 38 which is driven by sprocket chain 39 from a sprocket wheel mounted upon the shaft of the upper roll 14. This type of construction while producing a somewhat less rigid sheet than that shown in Fig. 6 does, however, give the plastic substance which is applied to the corrugated sheet relatively larger keying or locking elements which prevent the plastic substance from being detached therefrom.

In a machine of this character it will be appreciated that it is essential that all of the units be driven in timed relation, and for this reason power is applied from a source such as the motor shown at 40 to drive the differential gearing diagrammatically shown at 41, the power being transmitted therefrom through gears 42 and 43 to a shaft 44 positioned longitudinally of the apparatus. Upon this shaft are mounted beveled gears 45 meshing with similarly beveled gears 46 mounted upon the shafts of the lower rolls of the respective units. The details of this drive are purposely omitted, as they are obvious from the plan view shown in Fig. 2, it being essential only to show diagrammatically that the units function in timed relation to prevent any uneven feeding of the sheets with the apparatus.

The description of the invention has been particularly drawn to an apparatus for making a plaster board to be used in place of wood or metal lath, but it will be noted that while this product has been described for the purpose of disclosing the features of the invention, in its broader aspects the invention includes the forming of a corrugated structure in which the corrugated sheet is applied to an adhesive coated base. A further feature of the machine is the fact that the corrugating element remains continuously with the corrugations of the sheet during its entire passage through the machine, thus preventing the deformation of the corrugations.

The use to which the corrugated sheet is to be put will determine the character of the corrugations and the type of paper stock which is to be used, also the units of the apparatus may be varied to produce the desired structure.

I claim as my invention:

1. A machine for making corrugated board comprising corrugating rolls for corrugating a sheet, means for making a series of spaced apart transversely extending incisions in the continuously moving corrugated sheet at predetermined longitudinal intervals, a continuous belt providing transversely extending bars insertable in said corrugations, means for coating a plain surface sheet with an adhesive, and means for fixedly uniting said coated sheet with the corrugated sheet to form a unitary structure.

2. A machine for making corrugated board comprising corrugating elements for corrugating a sheet, means for making a plurality of spaced apart transversely extending incisions in a continuously moving sheet at longitudinal intervals and in the crests of said corrugations, an endless element having transversely extending bars registering with said corrugations during the travel of the sheet through the machine, means for coating a plain surface sheet with an adhesive, and means for fixedly uniting the base portions of the corrugated depressions formed in the sheet with the adhesive coated sheet.

3. A machine of the character described, comprising corrugating rolls having alternate extensions and depressions for corrugating a moving sheet, means for driving the sheet, and the rolls, driven means to hold the corrugations in place after they have left the corrugating rolls, means for driving another sheet in a path parallel with the movement of the corrugated sheet, and means for uniting the sheets together before the corrugations leave the corrugation holding means.

4. A machine of the character described, comprising corrugating rolls, an endless means having bars to enter the respective corrugations formed in the sheet and to move therewith after the sheet to be corrugated has left the rolls, spaced apart rolls between which the sheets and endless means pass, the latter rolls carrying slitting means to perforate the ridges, and means for uniting a second sheet to the corrugated sheet before the corrugated sheet leaves the machine.

5. A machine of the character described, comprising corrugating rolls for corrugating a moving sheet, driven means to hold the corrugations in place after they leave the rolls and to assist in driving the sheet, rolls for slitting portions of the ridges formed by the corrugations, and means for uniting a second sheet adhesively coated before the corrugations are released by the holding means.

6. A machine of the character described, comprising corrugating rolls for corrugating a moving sheet, driven means to hold the corrugations in place after they leave the rolls and to assist in driving the sheet, means for slitting portions of the ridges formed by the corrugations, means for uniting a second sheet adhesively coated before the corrugations are released by the holding means, and means for causing parts of the slit portions to be fixedly attached to the second sheet.

7. A machine for making corrugated board comprising corrugating rolls for corrugating a sheet, means for making a series of spaced apart incisions in the continuously moving corrugated sheet at predetermined intervals, a continuous belt providing transversely extending bars insertable in said corrugations, and means for fixedly uniting a second sheet with the corrugated sheet to form a unitary structure.

8. A machine for making corrugated board comprising corrugating rolls for corrugating a sheet, means for making a series of spaced apart incisions in the continuously moving corrugated sheet at predetermined intervals, a continuous belt providing transversely extending bars insertable in said corrugations, means for coating a plain surface sheet with an adhesive, and means for fixedly uniting the base portions of the corrugated depressions formed in the sheet with the adhesive coated sheet.

9. A machine of the character described, comprising corrugating rolls for corrugating a moving sheet, driven means registering with the corrugations after they leave the corrugating rolls to hold the corrugations in place, removable slitting means contacting removable contacting means mounted on rolls for perforating the crests of the corrugations, and a conveyer for removing the perforated sheet.

10. A machine for making corrugated board comprising corrugating rolls for corrugating a continuously moving sheet, means for making a series of spaced apart incisions in the sheet at predetermined intervals, a continuous belt providing transversely extending bars insertable in said corrugations.

11. A machine for making corrugated board comprising corrugated rolls for corrugating a continuously moving sheet, means for making a series of spaced apart incisions in the sheet at predetermined intervals, comprising rolls carrying removable slitting means and contacting with rolls having removable contacting means mounted thereon, a continuous belt providing transversely extending bars insertable in said corrugations.

12. A machine for corrugating a moving sheet, comprising corrugating rolls having alternately disposed projections and depressions registering to produce the corrugations, a forwardly moving means registering with the corrugations to hold them in place, perforating means removably mounted on a cutting roll and adapted to contact plates removably mounted on a bed roll, and projecting therefrom, the radius of the projection allowing the perforating means to always register the same distance from the projection at the point of registration.

13. A machine for making corrugated board comprising corrugating rolls adapted to corrugate an advancing sheet, rolls having removably positioned thereon a series of spaced apart slitting members contacting plates removably positioned on other rolls, one adapted to lie in a circular plane different than the plane of its periphery, and the other having a substantially flat surface.

HARRY A. CUMFER.